Feb. 26, 1963 — B. E. KIERNAN — 3,078,546
CUTTING TOOL
Filed June 13, 1960
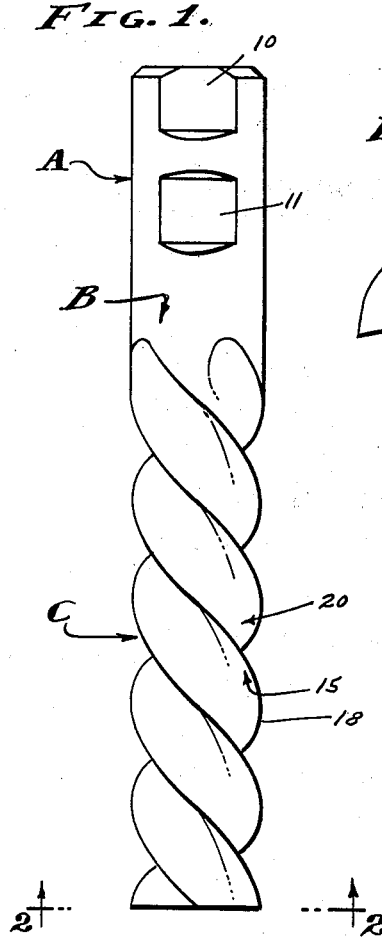
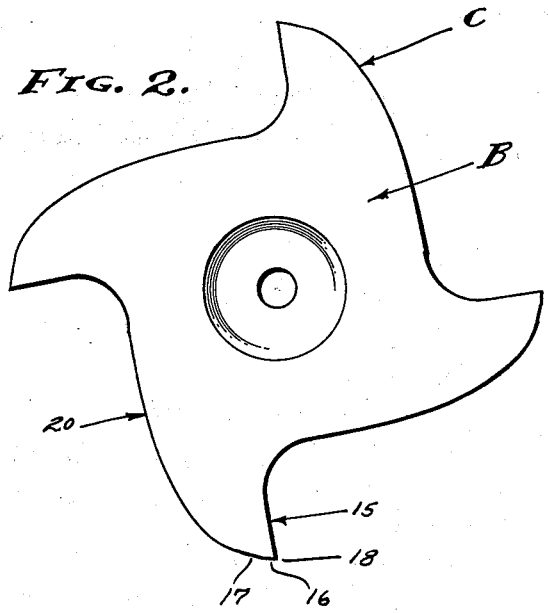
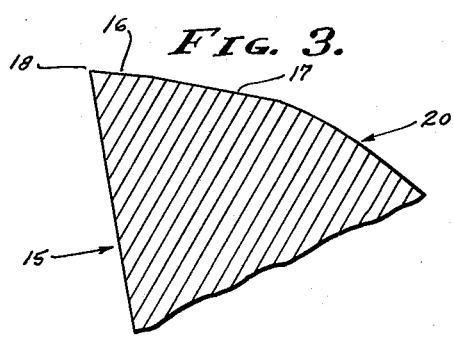
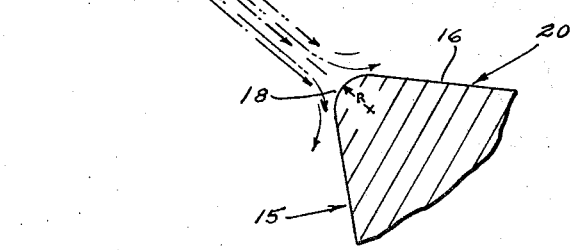
INVENTOR.
BRUCE E. KIERNAN
BY
W. H. Maxwell
AGENT United States Patent Office 3,078,546
Patented Feb. 26, 1963

3,078,546
CUTTING TOOL
Bruce E. Kiernan, 13518 Tangier Ave., Bellflower, Calif.
Filed June 13, 1960, Ser. No. 35,532
5 Claims. (Cl. 29—95)

This invention relates to a cutting tool and method of making the same and is particularly concerned with the production of cutters suitable for the machining of exotic metals, it being a general object of this invention to render feasible the use of mill cutters and the like in the machining of metals that are otherwise considered non-machinable for commercially practical purposes.

The art of machining is highly developed with the availability of a multitude of cutting tools designed to remove metal. These tools vary widely and range from a "bit" as used in an engine lathe, to "drills" and "reamers" and also "mill cutters." There are, of course, many other specialized types of tools, for example "fly-cutters," the present invention being applicable to each and all of these tools and to any tools of this category. In other words, the present invention has to do with the removal of metal, particularly hard or difficult to machine metal, by a shearing action whereby a continous chip or chips are formed.

In spite of the developments that have been made in the cutter art and in spite of the use of the special "high-speed" steels, the machining of exotic metals is many times practically impossible because of the short life of the ordinary cutting tools. That is, a mill cutter, for example, is very quickly worn out during ordinary machining operations, with the result that machine work becomes extremely expensive and/or prohibitive. Now, when I refer to exotic metals I mean to include such metals as nickel-chromium-iron alloys, and titanium, columbium, tantalum and tungsten and their alloys, etc., and these metals are often to be machined in their full hard condition. It will be readily apparent to those skilled in this art that such metals very quickly destroy the highest quality tools.

An object of this invention is to provide a longer lived cutting tool for the removal of metal in a machine tool, particularly in the machining of tough so-called exotic metals.

Another object of this invention is to provide a unique method of producing a more durable cutting edge in a cutting tool for the removal of metal in a machine tool, and particularly the removal of exotic metals.

Another object of this invention is to provide a novel cutting edge in a cutting tool of the character referred to and which is particularly adapted to economically remove metal, and more specifically to remove exotic metals.

The various objects and features of my invention will be fully understood from the following detailed description of a typical preferred form and application of my invention throughout which description reference is made to the accompanying drawings, in which:

FIG. 1 is a side elevation of a milling cutter incorporating the embodiments of the present invention.

FIG. 2 is an enlarged end view taken as indicated by line 2—2 on FIG. 1.

FIG. 3 is an enlarged detailed sectional view of a portion of the cutter formation shown in FIG. 2, showing the tooth formation of an ordinary cutter before the treatment provided by the method of the present invention.

FIG. 4 is a much enlarged sectional view similar to FIG. 3 and shows the application of the method that I have provided and the resultant formation of the tooth and cutting edge of the tool.

The present invention being particularly adapted to use in mill cutters, I will describe it in this connection, it being understood that the invention is to be applied broadly to tools in general. As illustrated in the drawings, the tool is a milling cutter having a shank A and an integrally formed body B with a cutting portion C. The body B is, for example, of high speed steel, more specifically a high cobalt bearing steel, which is heat-treated to Rockwell hardness of 64/66. The shank A is shown as a straight cylindrical portion with suitable key or drive faces 10 and 11. The cutting portion C is machined into the body B, before or after heat treatment, in the usual manner, to thereby establish a tooth formation with a sharpened edge having a cutting action when the body B is turned or rotated.

In the particular tool illustrated, the tooth formation or cutting edge is formed on a 45° left-hand helix adapted to make a right-hand cut. This particular tool formation, with the clearances within the range hereinafter specified, has been proven for machining of exotic metals of the class under consideration. As is shown, the cutter cross section involves a plurality of teeth, each with a cutting edge, preferably four teeth equally spaced circumferentially of the cutter body B. Since the present invention deals primarily with the specific formation and treatment of the cutting edge I will describe but one of said edges, it being understood that one or more of said edges can be employed as circumstances require.

The tooth formation that I have illustrated is characterized by a front face 15 having positive radial rake of 10° to 12°, and by a back face 20 that curves volutely inward to the base of the next following tooth. The cutting edge is formed at the vertex of the front face 15 and back face 20 and in accordance with the usual practice there is clearance angle applied to the back face at or in the area of the said cutting edge. More specifically, there is provided primary and secondary clearances 16 and 17, said clearance 16 being adjacent the cutting edge and the clearance 17 being next adjacent to the cutting edge and continuing into the back face that extends rearward and inward.

In rotating cutters of the type under consideration and up to 3 inches in diameter the said primary clearance 16 is maintained at about 6° while the secondary clearance 17 is maintained at about 9°. In larger diameter cutters of this type the primary clearance 16 is reduced to about 4° while the secondary clearance is reduced to about 7°. In any case, the clearances can be reduced as cutter diameter increases.

In accordance with the present invention the front face 15 and primary clearance 16 are produced and/or treated so as to improve cutting characteristics of the tool. The ordinary tool of the type under consideration has front and back clearance faces 15 and 16, as above specified, and finished to a smoothness of 45/80 microinches (minimum) and converging to an absolutely razor-sharp cutting edge. In said usual practice, the said cutting edge remains as sharp as it is possible to be produced. With the foregoing features in mind, the present invention involves the smoothness of the faces 15 and 16 together with the sharpness of the edge formed by the vertex thereof.

In carrying out the present invention, the face 15, at least at the periphery of the cutter and to a substantial depth, preferably to and throughout the radius that adjoins with the next preceding tooth, and the face 16 are refinished to a smoothness of at least about 20 microinches and better, or smoother. Further, the vertex of the two faces 15 and 16 is rounded and made convex at 18, it being found that a .001 inch radius produces a satisfactory cutting edge for removing chips from the exotic metals, as specified above.

In order to produce the microfinish and radiused cutting edge specified, the method of the present invention specifically involves first the process of grinding and second the process of liquid honing or vapor blasting, wherein a fluid is jetted or projected onto the area to be smoothed and rounded. In carrying out the said first step of grinding, the surfaces to be smoothed are subjected to the abrasive action of a relatively fine grit wheel and the surfaces reduced to a smoothness in the approximate range are about 20 microinches. In carrying out the said second step of liquid honing or vapor blasting, as the case may be or however termed, the said surfaces are further reduced to a finer and smoother finish by the more accurate and refined process of said liquid honing and/or vapor blasting. In practice, it is preferred to direct a stream of abrasive fluid onto the cutting surfaces and edge formed thereby, substantially bisecting the angle thereof, as shown clearly in FIG. 4. Thus, the faces 15 and 16 are reduced to a smoothness in the approximate range of about 10 microinches and smoothed while the cutting edge is simultaneously rounded to a convex radius 18 as specified.

From the foregoing it will be apparent that the present article and method of producing the same is extremely simple to produce and carry out. However, the results are phenomenal and unexpected. It is not only possible, with the instant invention, to remove metals that are otherwise non-machinable, but the tool life is increased as much as tenfold by actual test and comparison. The cutter described is designed to cut the above mentioned alloys as easily in the full hard condition as do conventional untreated mill cutters cut softer heat-treated SAE 4000 series steel. Due to the high helix angle, the cutting is accomplished by shearing action thereby producing a tightly curled chip that clears the cutter with facility, and imparting a smooth finish on the workpiece in the range of 18/26 microinches.

Having described only the typical preferred forms and applications of my invention, I do not wish to be limited or restricted to the specific details herein set forth, but wish to reserve to myself any variations or modifications that may appear to those skilled in the art and fall within the scope of the following claims:

Having described my invention I claim:

1. A cutting tool for machining metal and having a tooth formation with a front face and a back face converging to a sharpened cutting edge, the said front and back faces being finished to a smoothness of about 10 microinches in the area of the cutting edge, and the said cutting edge being convexly rounded to about a .001 inch radius.

2. A cutting tool for machining metal and having a tooth formation with a front face with rake of about 10° and a back face with primary clearance of about 6° and said faces converging to a sharpened cutting edge, the said front and back faces being finished to a smoothness of about 10 microinches in the area of the cutting edge, and the said cutting edge being convexly rounded to about a .001 inch radius.

3. A mill cutter for machining metal and having a rotatable body and a tooth formation with a front face and a back face converging to a peripheral circumferentially disposed cutting edge, said cutting edge being disposed on a helix, the said front and back faces being finished to a smoothness of about 10 microinches in the area of the cutting edge, and the said cutting edge being convexly rounded to about a .001 inch radius.

4. A mill cutter for machining metal and having a rotatable body and a tooth formation with a front face with radial rake and a back face with clearance and said faces converging to a peripheral circumferentially disposed cutting edge, said cutting edge being disposed on a substantial helix, the said front and back faces being finished to a smoothness of about 10 microinches in the area of the cutting edge, and the said cutting edge being convexly rounded to about a .001 inch radius.

5. A mill cutter for machining metal and having a rotatable body and a tooth formation with a front face with radial rake of about 10° and a back face with primary clearance of about 6° and said faces converging to a peripheral circumferentially disposed cutting edge, said cutting edge being disposed on about a 45° helix, the said front and back faces being finished to a smoothness of about 10 microinches in the area of the cutting edge, and the said cutting edge being convexly rounded to about a .001 inch radius.

References Cited in the file of this patent

UNITED STATES PATENTS

| | | |
|---|---|---|
| 2,278,738 | Prag | Apr. 7, 1942 |
| 2,377,329 | Dettmer | June 5, 1945 |
| 2,455,538 | Wagner | Dec. 7, 1948 |
| 2,467,302 | Forster | Apr. 12, 1949 |
| 2,778,924 | Hill | Jan. 22, 1957 |
| 2,889,669 | Babbitt | June 9, 1959 |
| 2,897,692 | Beckner | Aug. 4, 1959 |

FOREIGN PATENTS

| | | |
|---|---|---|
| 673,026 | Great Britain | May 28, 1952 |

OTHER REFERENCES

Article, "Bearing Lands and Negative Rakes Prolong Cutting Tool Life" by Mark W. Purser from American Machinist Magazine of Aug. 2, 1945, pages 118–121.

Article, Making High-Speed Circular Forming-Tools, discussion by Charles Kugler from American Machinist Magazine, March 15, 1928, page 470.